Feb. 11, 1969  C. C. VAN NOY, JR  3,426,449

DEVICE FOR DEMONSTRATING MEDICAL PROCEDURES

Filed May 9, 1967

INVENTOR.
Cordell C. Van Noy, Jr.
BY
Larry N. Barger

INVENTOR.
Cordell C. Van Noy, Jr.

United States Patent Office 3,426,449
Patented Feb. 11, 1969

3,426,449
DEVICE FOR DEMONSTRATING MEDICAL PROCEDURES
Cordell C. Van Noy, Jr., Granada Hills, Calif., assignor, by mesne assignments, to American Hospital Supply Corporation, a corporation of Illinois
Filed May 9, 1967, Ser. No. 637,276
U.S. Cl. 35—17                                    11 Claims
Int. Cl. G09b 23/34

ABSTRACT OF THE DISCLOSURE

A hollow transparent shell in the shape of a human female for teaching students how to insert tubes and catheters into a human body. Inside the transparent shell are hollow translucent organ members (trachea, esophagus, bladder, vagina and rectum) with silicone coating on their interior surfaces to simulate a lubricity of comparable organs in a human body. The bladder, vagina and rectum organ members also have foam material bushings at their respective mouth orifices to stimulate the texture and resiliency of these orifices in a human body.

---

This invention has to do with a mannequin-like device for teaching student nurses how to insert catheters, tubes, enemas, etc. into a human patient.

In the past, teaching of these medical procedures has been done largely by flat paper charts and oral instructions. These do not give the nurse a definite feel of how the catheter slides into the patient and how hard she should push on the catheter or tube.

For nurses to practice on before actually inserting a catheter or tube into a human patient, I have invented a life-size plastic practice model which simulates the size, position and shapes of various organ members into which a catheter or tube is inserted. These organ members are sufficiently translucent so their shape and location is clearly visible through a transparent outer shell of a human female form. The organ members however will let sufficient light pass through their walls so the position of the catheter inside the organ member can be easily seen.

To closely simulate how it feels to a nurse to insert a catheter into a patient, the organs have a silicone lubricating coating on their interior surface. I have found that this coating gives a resistance to inserting the catheter which is partially overcome by twisting the catheter as it is inserted in the way recommended for inserting a catheter into a human patient. Certain of the organ members (bladder, vagina and rectum) also have at their respective mouth orifices a foam rubber or plastic bushing to approximate the texture and resiliency of these orifices in a human body.

My invention can be better understood with reference to the following drawings in which.

Figure 1:
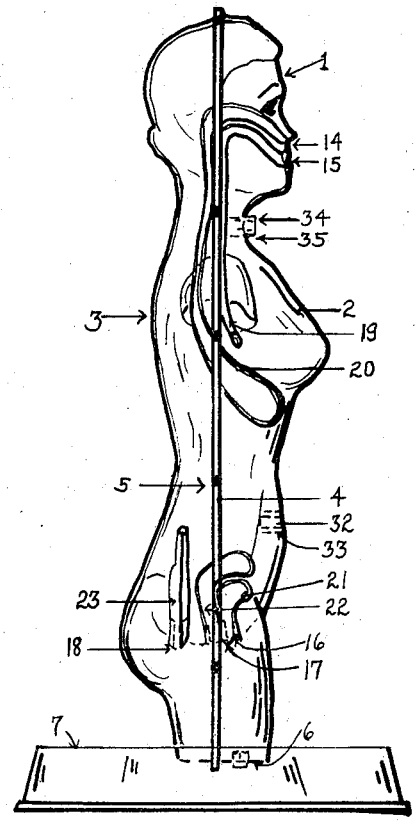
FIGURE 1 is a side elevational view of the demonstration device.

Referring to these drawings in detail, the demonstration device includes a hollow transparent shell formed of a hollow front portion 2 and a hollow rear portion 3 joined together at their respective peripheral flanges 4 and 5 to depict a three dimensional human female form. This form has a head and a torso, and terminates at its lower end 6 along a transverse plane across leg portions of this human female form.

Attached to this lower end 6 and supporting the transparent shell 1 is a supporting base 7. This supporting base 7 has a top wall 8 with indented areas 12 and 13 for receiving leg portions of the transparent shell 1. A bottom wall 9 is spaced below said top wall 8 by a side wall 10. These three walls define a chamber for storing demonstration tubes and catheters when not in use, and the side wall 10 has an opening 11 through which the tubes can be placed into and removed from the storage chamber.

Figure 2:
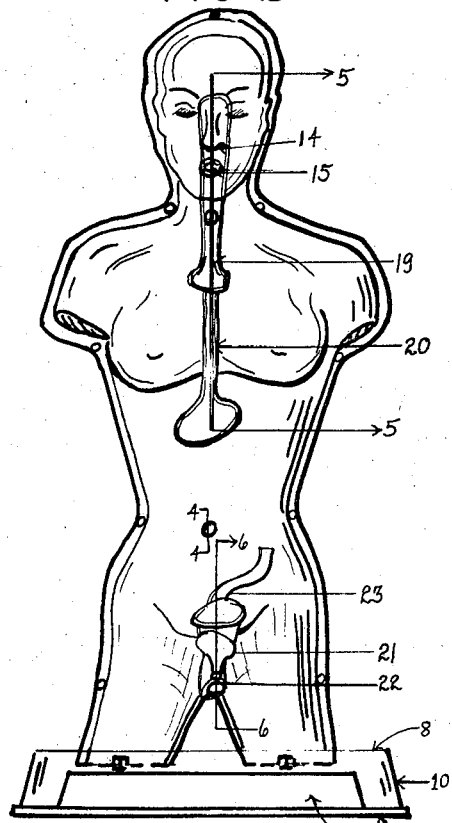
FIGURE 2 is a front elevational view of the demonstration device.
Figure 3:
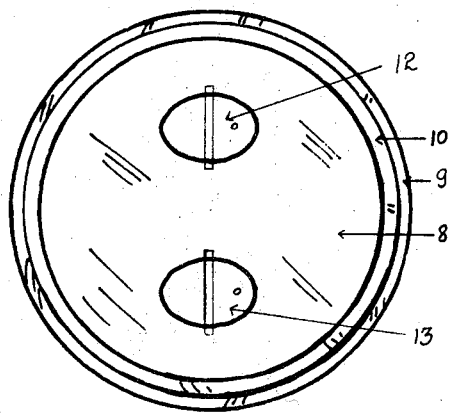
FIGURE 3 is a top plan view of a supporting base of the device.
Figure 4:
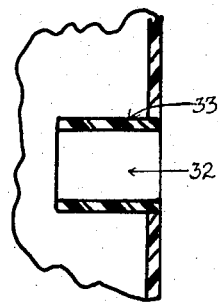
FIGURE 4 is a fragmentary cross-sectional view taken along line 4—4 of FIGURE 2.

When the demonstration device is used, the supporting base can be attached as in FIGURES 1 and 2 to support the transparent shell 1 in an upright position. However, the supporting member can be unbolted from the transparent shell 1 so the shell can be laid down to simulate a reclining patient. Often, urethral catheters, enemas, etc. are inserted while the patient reclines.

Figure 5:
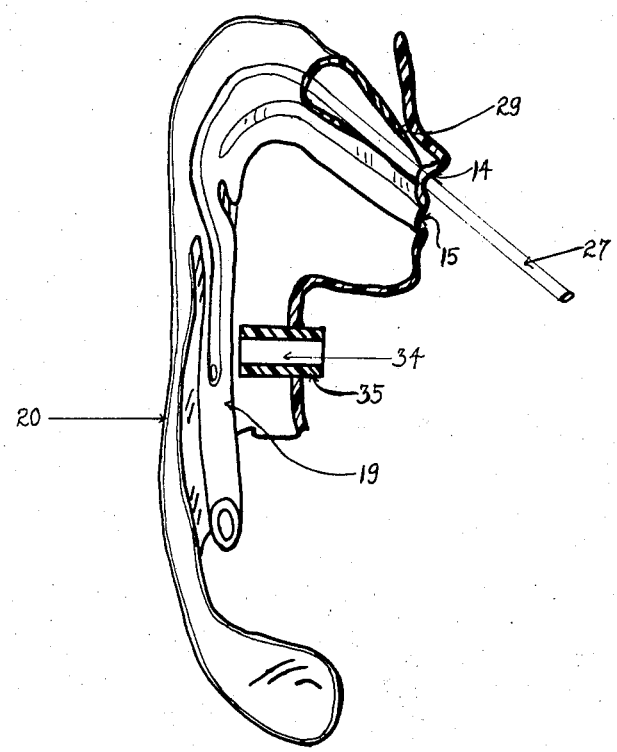
FIGURE 5 is a fragmentary cross-sectional view taken along line 5—5 of FIGURE 2.
Figure 6:
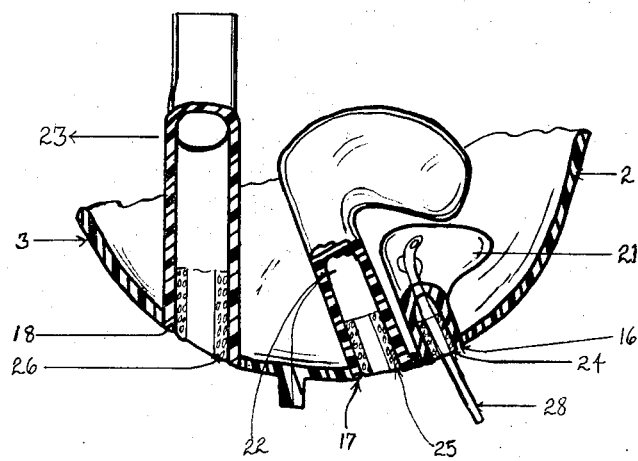
FIGURE 6 is a fragmentary cross-sectional view taken along line 6—6 of FIGURE 2.

As shown in FIGURES 1 and 2 and in the enlarged fragmentary cross-sections of FIGURES 5 and 6, the outer transparent shell 1 has nose opening 14, mouth opening 15, urethra opening 16 and vagina opening 17 in the hollow front portion 2. Hollow rear portion 3 has anus opening 18. When the front and rear portions 2 and 3 are connected together, they encase hollow organ members including a trachea 19, an esophagus 20, a bladder 21, a vagina 22 and a rectum 23 which have interior chambers communicating with their respective orifice openings in hollow transparent shell 1 and are adapted to receive catheters or tubes.

These various organ members mentioned above are translucent so their shapes and positions are clearly visible through the transparent shell 1. If the organ members were transparent it would be hard to distinguish the organ members from the transparent shell 1. On the other hand, the organ members are not opaque so as to hide the catheters or tubes inside them. Preferably, the organ members are colored to simulate a comparable organ in a human body. I have found that a red translucent coloring on the organ members' surface serves all of these purposes and works very well.

As a nurse inserts a catheter into a human patient it meets with certain resistance and the resistance is reduced by twisting the catheter as she inserts it. As the tubes and catheters are often of polyvinyl chloride plastic, they tend to stick to the plastic organ member. The present invention overcomes this disadvantage by providing a lubricating coating of silicone sprayed on interior surfaces of the organ members. Thus, inserting a tube or catheter into these organ members feels much like inserting it into a human body. The tube or catheter meets a certain resistance against this silicon coating 29 which is overcome to a large extent by twisting the tube or catheter as it is pushed into the body organ. FIGURES 5 and 6 show such catheters 27 and 28 being inserted into the trachea 19 and bladder 21, respectively.

As shown in FIGURE 6, catheter 28 is inserted through a foam rubber or foam plastic (such as polyurethane) bushing 24. This gives the nurse a feel for the texture and resiliency of the urethra opening 16 of this organ member. Likewise, foam bushings 25 and 26 are provided in vagina opening 17 and anus opening 18.

There are also various other medical procedures that can be taught with this device. The transparent shell 1 has a colostomy opening 32 through an abdominal wall with a stub sleeve 33 surrounding colostomy opening 32. Thus, a nurse can practice tube insertion or colostomy bag attachment to a patient. The transparent shell 1 also has a tracheostomy opening 34 in its throat and here again the opening is surrounded by a stub sleeve 35. Thus, a nurse can also practice tube insertion, apply dressings, etc. to a tracheostomy patient.

I have described the structure of my invention which includes a transparent shell 1 with organ members encased therein. The hollow transparent shell 1 can be conveniently made of an acrylic plastic (methylacrylate) and the organ members are easily made of methylcellulose acetate or cellulose acetate butyrate.

In the foregoing specification and drawings I have used a specific embodiment to illustrate my invention. It is understood that persons skilled in the art can make certain modifications to this embodiment without departing from the spirit and scope of the invention.

I claim:

1. A three dimnesional device for teaching students how to insert tubes into a human body, said device comprising: a hollow transparent shell in the form of a human body with at least one opening therethrough for insertion of a tube; a hollow translucent organ member attached to and encased within the hollow transparent shell and adapted to receive a tube inserted through said opening in the hollow transparent shell, said hollow organ member being sufficiently translucent so its shape is clearly visible through the hollow transparent shell and yet will show the position of a tube inserted into the organ member; and a lubricating coating on an interior surface of said organ so as to simulate a comparable organ in a human body.

2. A three dimensional device as set forth in claim 1 wherein the hollow transparent shell has a female shape and has nose, mouth, urethra, vagina and anus openings; and hollow organ members which include a trachea, and esophagus, a bladder, a vagina and a rectum connected to their respective openings in said hollow transparent shell.

3. A three dimensional device as set forth in claim 2 wherein the urethra, vagina and anus openings have bushings of a foam material to simulate the texture and resiliency of such openings in a human body.

4. A three dimensional device as set forth in claim 1 wherein the organ member has a silicone lubricant coating on its interior surface.

5. A three dimensional device as set forth in claim 1 wherein the transparent hollow shell is comprised of a hollow rear portion and a hollow front portion, each of said portions having an external flange about its edge, said flanges being fastened to each other to lock the front and rear portions together to encase the organ member.

6. A three dimensional device as set forth in claim 1 wherein the hollow transparent shell terminates at its lower end at a transverse plane across leg portions of the human form depicted by the shell, said lower extremity of the transparent shell being removably secured to a supporting base.

7. A three dimensional device as set forth in claim 5 wherein the supporting base has an upper wall joined to said transparent shell, a lower wall spaced below said upper wall and a peripheral side wall joined to edges of the top and bottom walls, said walls defining a storage chamber for demonstration tubes with the side wall having an opening through which demonstration tubes can be placed into and removed from the storage chamber.

8. A three dimensional device as set forth in claim 5 wherein the hollow transparent shell has urethra, vagina and anus openings above said supporting base whereby tubes may be inserted while the hollow transparent shell is attached to the supporting base.

9. A three dimensional device as set forth in claim 1 wherein the hollow transparent shell has a colostomy opening through an abdominal wall of the shell, which shell has a stub sleeve surrounding said colostomy opening through which a tube may be inserted.

10. A three dimensional device as set forth in claim 1 wherein the hollow transparent shell has a tracheostomy opening through a throat wall of the shell, which shell has a stub sleeve surrounding said tracheostomy opening through which a tube may be inserted.

11. A three dimensional device for teaching students how to insert tubes into a human body, said device comprising a hollow transparent shell in the shape of a human female form terminating at its lower end along a transverse plane across leg portions of the human female form depicted by the hollow transparent shell; said shell comprised of a hollow front portion and a hollow rear portion, each of which has an external flange about its edge, said flanges being secured to each other to form the complete shell; said front portion having nose, mouth, urethra and vagina openings with said rear portion having an anus opening; a series of hollow translucent organs encased within said hollow transparent shell, said organ members including a trachea, an esophagus, a bladder, a vagina and a rectum joined to their respective openings in the hollow transparent shell, each of said organ members being sufficiently translucent so their shape can be easily seen through the hollow transparent shell and yet will still show the position of a tube inserted into the organ member, said organ members each having a silicone lubricant coating on an interior surface; a foam material bushing in each of the urethra, vagina and anus openings to simulate the texture and resiliency of such openings in a human body; a supporting base removably attached to the lower extremity of said hollow transparent shell, said supporting base including an upper wall with indentations into which fit lower terminal ends of legs depicted by said hollow transparent shell, a lower wall spaced below said upper wall, and a peripheral side wall joined to edges of the top and bottom walls, said walls defining a storage chamber for demonstration tubes, with the side wall having an opening through which the demonstration tubes can be placed into and removed from the storage chamber.

References Cited

UNITED STATES PATENTS

| 2,034,446 | 3/1936 | Saxe | 35—17 |
| 2,971,272 | 2/1961 | Barlow | 35—17 |
| 3,309,791 | 3/1967 | Kelley et al. | 35—17 X |
| 3,376,659 | 4/1968 | Asin et al. | 35—17 |

OTHER REFERENCES

Clay-Adams catalogue 105, 1953, p. 173 pertinent.

EUGENE R. CAPOZIO, *Primary Examiner.*

HARLAND S. SKOGQUIST, *Assistant Examiner.*